United States Patent [19]
Stoves

[11] Patent Number: 5,951,221
[45] Date of Patent: Sep. 14, 1999

[54] APPARATUS FOR IN-PIPE USE

[75] Inventor: Derek Stoves, Newcastle upon Tyne, United Kingdom

[73] Assignee: BG plc, United Kingdom

[21] Appl. No.: 08/983,062

[22] PCT Filed: Jun. 10, 1996

[86] PCT No.: PCT/GB96/01389

§ 371 Date: Mar. 13, 1998

§ 102(e) Date: Mar. 13, 1998

[87] PCT Pub. No.: WO96/41694

PCT Pub. Date: Dec. 27, 1996

[30] Foreign Application Priority Data

Jun. 12, 1995 [GB] United Kingdom ............... 9511908

[51] Int. Cl.$^6$ ........................................... B23C 1/30
[52] U.S. Cl. .................. 409/143; 166/55; 166/55.2; 166/55.8; 166/297; 408/79; 408/102; 408/138; 409/185
[58] Field of Search ............................. 408/79, 102, 138; 166/55, 55.2, 55.6, 55.7, 55.8, 297; 409/143, 185

[56] References Cited

U.S. PATENT DOCUMENTS

| | | |
|---|---|---|
| 4,986,314 | 1/1991 | Himmler ........................ 409/143 |
| 5,046,903 | 9/1991 | Nagayoshi et al. ............... 409/143 |
| 5,088,553 | 2/1992 | Ralston et al. .................. 409/143 |
| 5,105,882 | 4/1992 | Ralston et al. .................. 409/143 |
| 5,197,540 | 3/1993 | Yagi et al. ..................... 409/143 |
| 5,378,092 | 1/1995 | Griner . |
| 5,799,729 | 9/1998 | Breckwoldt et al. ............. 409/143 |

FOREIGN PATENT DOCUMENTS 2 158 756   11/1985   United Kingdom .

*Primary Examiner*—Daniel W. Howell
*Assistant Examiner*—Monica Smith
*Attorney, Agent, or Firm*—Larson & Taylor

[57] ABSTRACT

Apparatus for cutting a hole through a plastic liner in a gas or other main comprises a body forming module of a train of modules adapted to travel through the main. The body has a radially movable platform carrying a cutter. The platform has four cams engaging four cams pivotally mounted on tie-bars. Advancing movement of the platform pushes the cams outwardly causing support legs to move outwardly and to cause four slave legs carried by the support legs to engage the plastic liner. Further advancing movement of the platform causes the cutter to engage the liner and also holds the support legs in their advanced position as noses on the cams traverse the faces of the cams.

9 Claims, 7 Drawing Sheets

APPARATUS FOR IN-PIPE USE

FIELD OF THE INVENTION

The invention relates to apparatus for in-pipe use.

BACKGROUND OF THE INVENTION

In order to remotely drill or mill a hole in a pipe wall using an in-pipe device the drill bit must be aligned at right angles to the axis of the pipe and a means of reacting the load exerted on the drill against the pipe wall must be provided. Most existing in-pipe machines are designed to operate in pipes sufficiently large that the inclusion of a separate actuator specifically to provide a reaction support is feasible. In smaller pipes such an actuator is difficult to accommodate, therefore there was a need to consider an alternative approach.

SUMMARY OF THE INVENTION

The invention has particular application to cutting a hole through a liner composed of polymeric material, such as polyethylene, in a relatively small diameter gas main but the invention is applicable quite generally for example to larger gas mains and to water and sewage pipes whether the main or pipe contains a liner or not. In such a liner, the hole is aligned with a lateral offtake pipe, known as a service pipe, leading to a dwelling or commercial property. The invention is not restricted to cutting a hole as other operations are envisaged such as milling or grinding or drilling, for example, and in this specification the words "work-performing device" are intended to embrace a device which performs one of those operations at least.

According to the invention, apparatus for in-pipe use includes a body and a work-performing device which is advanceable and retractable relatively to said body in a direction transverse to the length of said body, said apparatus comprising a mechanism which is actuatable in response to advance of said device to advance support means, said mechanism thereafter being effective to prevent retraction of said support means while allowing further advance of said device.

The support means may comprise two support legs on opposite sides of said direction.

The support means preferably comprises four support legs, two being on one side of said direction and two being on the opposite side of said direction.

Said support leg in each case preferably comprises a master leg advanceable by one of said mechanisms and a slave leg with a compression spring arranged between the master and slave legs, said slave leg leads said master leg during advance of the legs then, after said slave legs have engaged the inner surface of said pipe, said master leg continues to be advanced to compress said spring but said master leg does not advance as far as said slave leg.

The invention will now be further described, by way of example, with reference to the accompanying drawings in which:

DETAILED DESCRIPTION OF THE PREFERRED EMBODIMENTS

Figure 1:
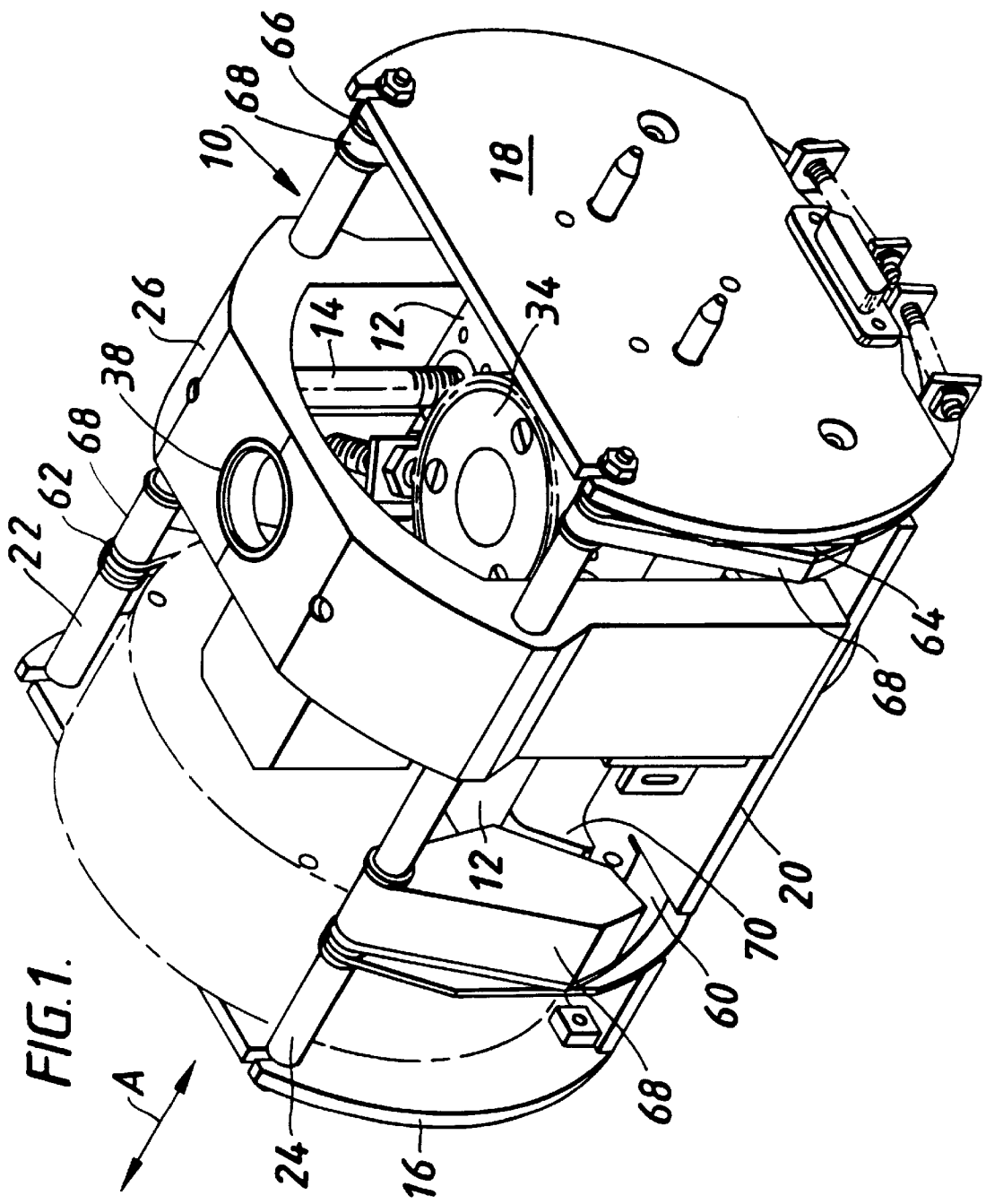
FIG. 1 is a three dimensional view of the apparatus.
Figure 2:
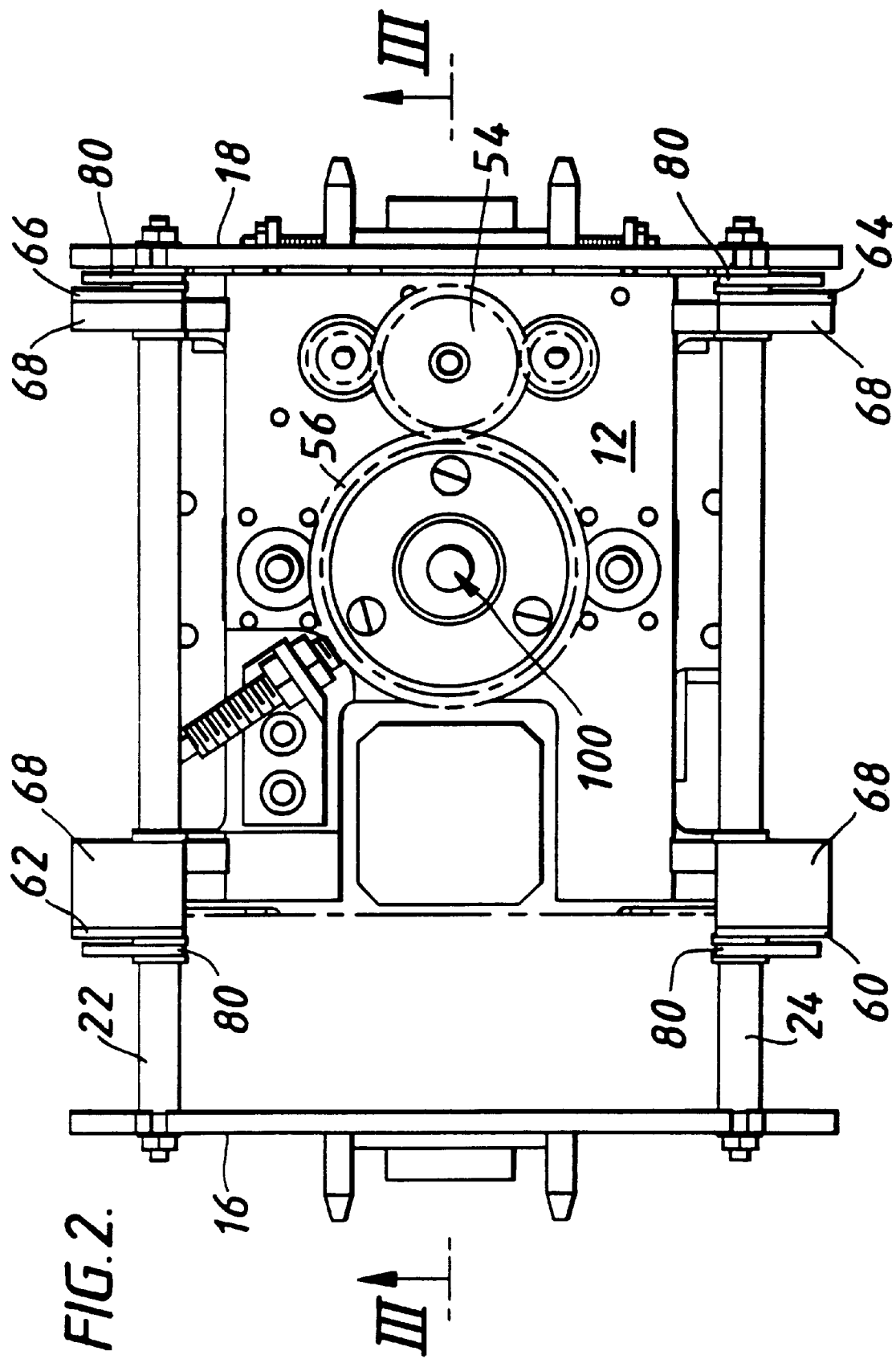
FIG. 2 is a plan view of the apparatus, with parts removed for clarity.

FIGS. 1 to 7 show apparatus consisting of a body 10 (FIG. 1) which is intended in use to form one module of a train of modules which are inserted in a pipeline such as a gas main, for example. The train is self-propelled by means (not shown) and supported by wheels (not shown). The body 10 is intended to be provided with a structure for supporting a work-performing device (not shown) such as a cutter, for example. The structure comprises a platform 12, which is movable while remaining parallel to itself relatively to the body 10 by means of two ball-screws 14. Thus, the device is advanceable and retractable relatively to the body 10 in a direction transverse to the length of the body 10. The length is parallel to the arrow A in FIG. 1 which is the direction in which the body 10 is intended to move along the gas main, or other pipeline, in use.

The body 10 includes end plates 16, 18 a base 20, two lengthwise tie-bars 22, 24 and a bridge 26.

The lower ends of the ball-screws 14 are journalled in sleeves 28 (FIG. 6) and the upper ends in bushes 30 in the bridge 26. Each ball-screw 14 passes through a nut 32 mounted in the platform 12.

The cutter (not shown) is mounted on a sleeve 34 which is rotatably supported on the platform 12 by bearings 36. The cutter is also supported by a sleeve 38 in an aperture at the top of the bridge 26.

The ball-screws 14 are rotated by an electric motor 40 which, through a gearbox 42, mounted on the base 20, drives a spur gear 44 which meshes with two spur gears 46. These in turn mesh with two further spur gears 48 fastened respectively on the ball-screws 14.

The cutter is driven by two electric motors 50, 52, mounted on the platform 12 which jointly drive a spur gear 54 meshing with a spur gear 56 which surrounds, and is secured to, the sleeve 34.

During the cutting operation the body 10, including the cutter, is held steady in the pipeline by support means which includes support legs and elements connected thereto to support the cutter in the pipe. In a preferred embodiment, the support means includes four support legs 60, 62, 64 and 66. Each support leg is pivotally mounted on one of the tie-bars 22, 24 and is secured to a cam 68 (which is also pivotally mounted on one of the tie-bars 22, 24.) Each cam 68 is engaged by another respective cam 70 integral with the platform 12 (FIG. 1).

Figure 5:
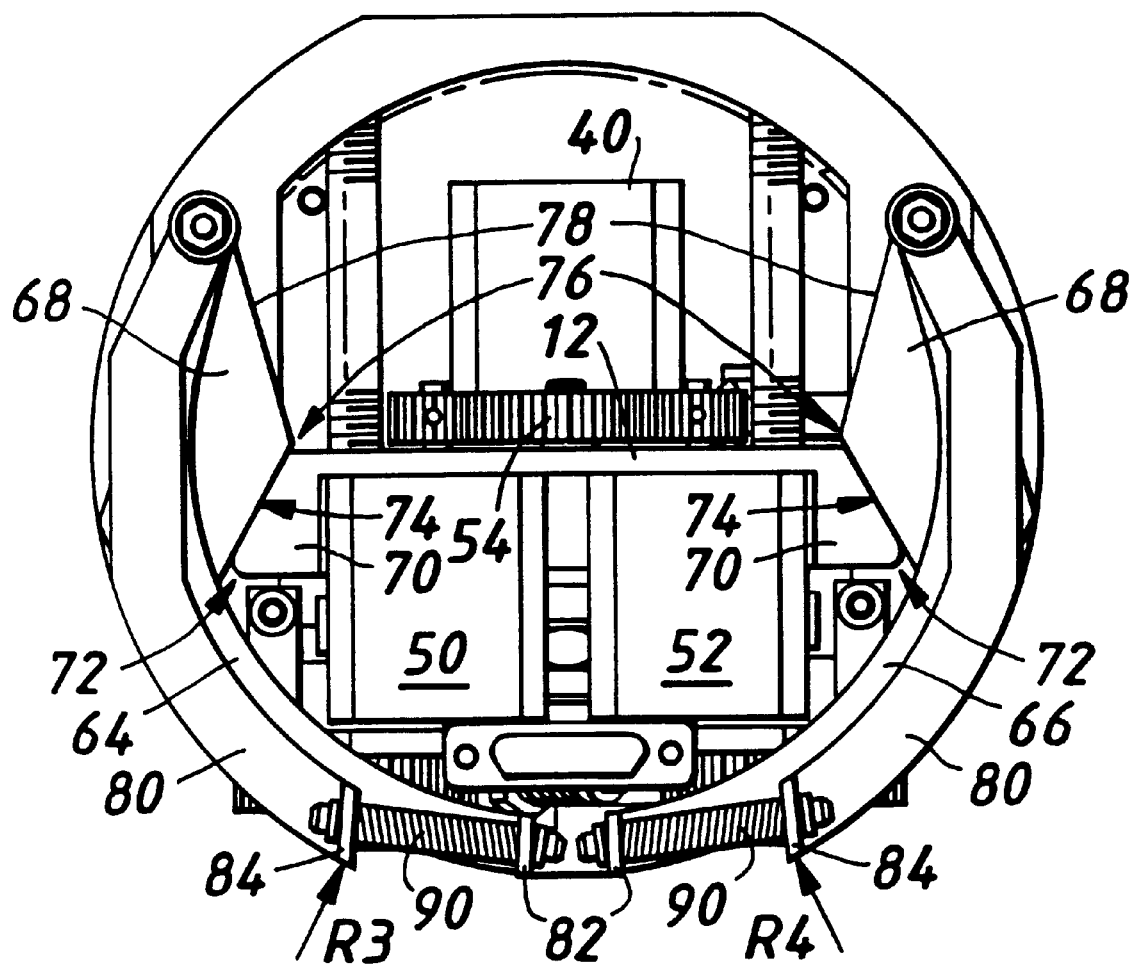
FIG. 5 is an end elevation looking in the direction of the arrow V in FIG. 3 with parts removed for clarity.

FIG. 5 shows most clearly the form of a mechanism comprising interacting cams 68 and 70. The cam 70 may be called a first cam. The first cam 70 has a first nose 72 and a first surface 74. The cam 68 may be called a second cam. The second cam 68 has a second nose 76 and a second surface 78.

FIG. 5 also shows the support legs 64 and 66, each of which also comprises a slave leg 80. The lower ends 82, 84 respectively of the legs 64 or 66 and the legs 80 are cranked and a compression spring 90 is located between the cranked ends. The spring 90 is pre-loaded to a pre-set compression. Each slave leg 80 is pivotally mounted on a tie-bar 22, 24.

Figure 4:
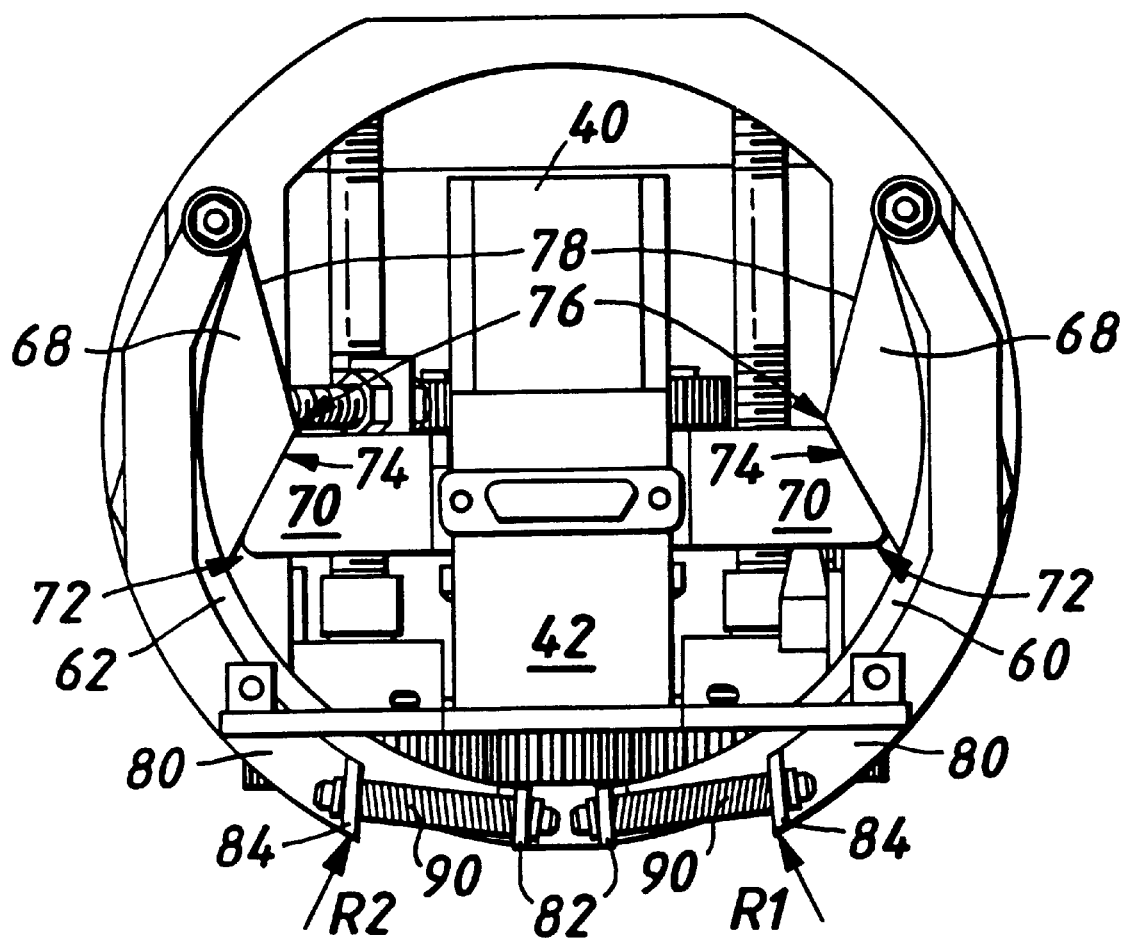
FIG. 4 is an end elevation looking in the direction of the arrow IV in FIG. 3 with parts removed for clarity.

FIG. 4 shows the support legs 60, 62 each comprising a slave leg 80 as described above with reference to FIG. 5.

FIG. 4 also shows the first cams 70 each having a first nose 72 and a first surface 72 and also shows the second cams 68 each having a second nose 76 and a second surface 78.

Figure 7:
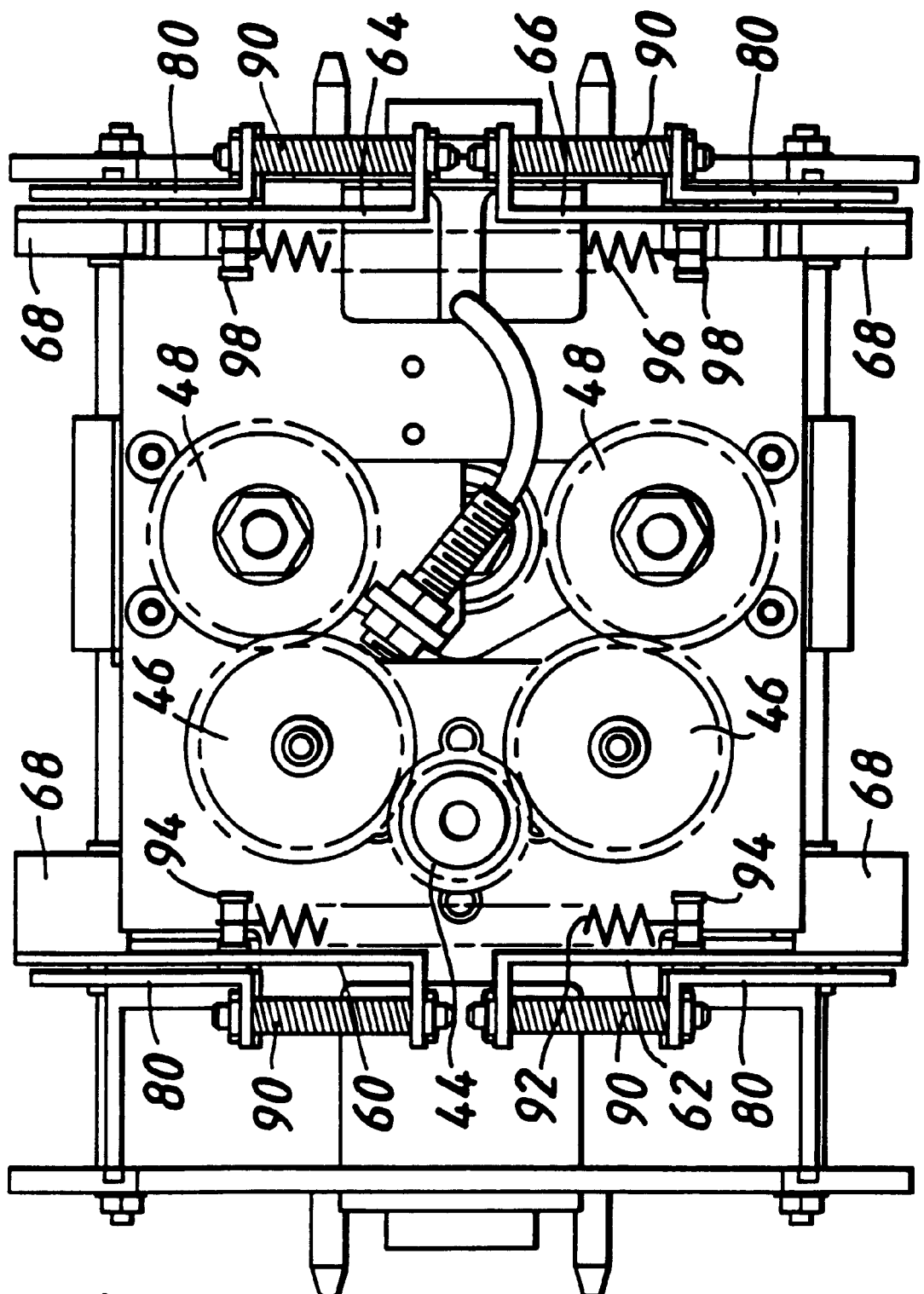
FIG. 7 is a view of the underside of the apparatus shown in FIG. 2.

FIG. 7 shows the two support legs 60 and 62 joined by a tension spring 92 which is pre-loaded to a pre-set tension and which has its ends anchored on pins 94 secured to the legs 60, 62. FIG. 7 also shows the support legs 64 and 66 joined by a tension spring 96, similar to the spring 92, and having its ends anchored on pins 98 secured to the legs 64 and 66.

FIG. 7 shows that the cams 68 attached to the support legs 60 and 62 are wider than the cams 68 attached to the support legs 64 and 66. The wider cams 68 however merely act as spacers in order that the support legs 60, 62 can properly clear the base 20. The line of advance of the cutter is shown in FIG. 7 as being very close to the centre of the four points of engagement which the slave legs 80 would make with the pipeline in use.

OPERATION

The body 10 is accurately positioned in the pipeline by accurately moving the train of modules within the pipeline. In the particular embodiment described the pipeline contains a polyethylene liner and the body 10 is accurately positioned opposite an offtake opening in the pipeline. The cutter is then required to cut a hole in the plastic liner aligned with the offtake opening. Subsequently, a plastic service pipe is inserted in the existing service pipe connected to the offtake opening from the domestic dwelling or commercial building to which the service leads. The plastic pipe is subsequently joined to the plastic liner at the opening cut in it by the cutter. Thus, a completely new plastic pipe system is inserted within the existing service pipe.

Preparatory to the start of cutting, the platform 12 is advanced to bring the cutter into engagement with the plastic liner in the pipeline. The advance of the four cams 70 (i.e., their upward movement as shown in FIGS. 4 and 5) with the platform 12 with which they are integral causes the faces 74 on the cams 70 to traverse past the noses 76 on the cams 68, forcing them to swing outwardly about the tie-bars 22, 24. The outward rotation of the cams 68 causes the outward rotation of the support legs 60, 62, 64 and 66 and the slave legs 80. The movement of the support legs stretches the return springs 92 (FIG. 7).

Ultimately, the slave legs 80 come into contact with the inside wall surface (not shown) of the plastic liner. The noses 72 continue their traverse of the faces 78 and this produces continued outward movement of the support legs 60, 62, 64, 66. This continued movement of the support legs 60, 62, 64, 66 occurs while the slave legs 80 are prevented from further outward movement by the inside wall of the plastic liner. The continued movement of the support legs 60, 62, 64, 66 slightly compresses the compression springs 90.

The apparatus is designed to be compatible with a range of internal diameters of the plastic liner. However, the pre-load in the springs 90 is sufficiently large to make slight differences in the degree of compression of the springs by the continued movement of the support legs 60, 62, 64, 66 just mentioned of no importance. The pre-load in the springs 90 is effectively the same whatever the precise position of the slave legs 80 is.

Continued motion of the cams 70 causes the noses 72 on the cams 70 to traverse the faces 78 on the cams 68. This has the effect of holding the support legs 60, 62, 64 and 66 in their outermost positions and preventing their retraction while allowing the cutter to continue its advance.

Figure 3:
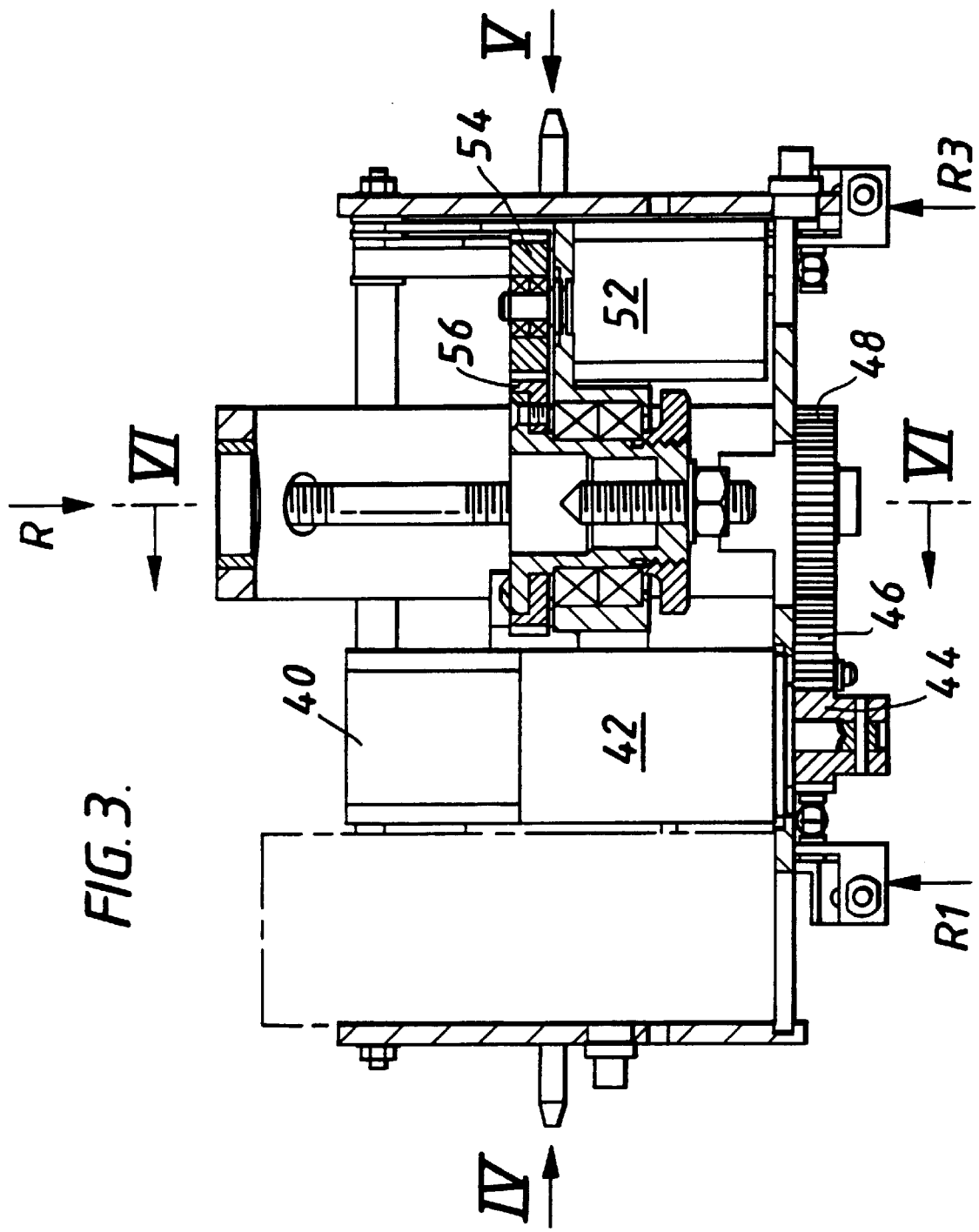
FIG. 3 is a vertical section on the line III—III in FIG. 2.
Figure 6:
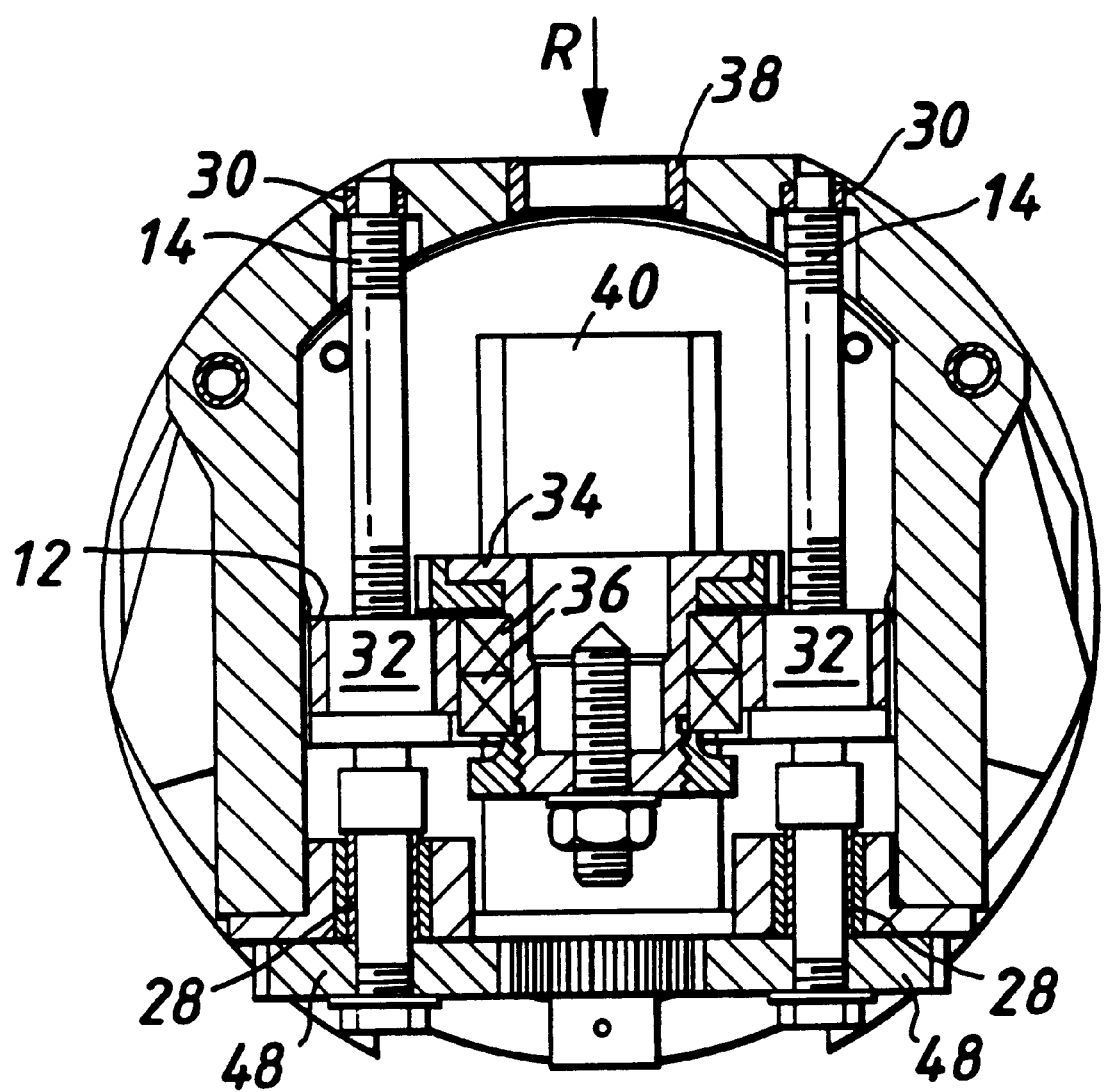
FIG. 6 is a vertical section on the line VI—VI in FIG. 3.

During this motion of the platform 12 the cutter engages the plastic liner and cuts its way through the liner. The reaction to the endwise force on the cutter acting radially inwardly through the point 100 (FIG. 2) and shown as the force R in FIGS. 3 and 6 is provided by the four radially inward reactions $R_1$, $R_2$, $R_3$ and $R_4$ at the slave legs 80 (FIGS. 3 and 4) provided by the plastic liner.

Thus, the body 10 is completely supported by the slave legs 80 during the cutting operation.

I claim:

1. Apparatus for in-pipe use including a body having a structure adapted to hold a work-performing device, which structure is advanceable and retractable relatively to said body in a direction transverse to the length of said body to advance and retract a work-performing device, said apparatus comprising a mechanism which is actuatable in response to advance of said structure to advance support means, said mechanism thereafter being effective to prevent retraction of said support means while allowing further advance of said structure.

2. Apparatus as claimed in claim 1, in which said support means comprises two support legs on opposite sides of said direction.

3. Apparatus as claimed in claim 1, in which said support means comprises four support legs, two being on one side of said direction and two being on the opposite side of said direction.

4. Apparatus as claimed in claim 2, in which said support leg in each case comprises a master leg advanceable by one of said mechanisms and a slave leg with a compression spring arranged between the master and slave legs, said slave leg leads said master leg during advance of the legs then, after said slave legs have engaged the inner surface of said pipe, said master leg continues to be advanced to compress said spring but said master leg does not advance as far as said slave leg.

5. Apparatus as claimed in claim 2, in which said mechanism comprises for each said support leg a first cam having a first nose and a first surface and being moveable relative to said body with said structure and a second cam fast with said support leg and which is pivotally connected to said body, said second cam having a second nose and a second surface, and advancing movement of said first cam with its first surface engaging said nose of said second cam causing said second cam to swing outwardly relative to said body, taking said support leg with it, then continued advancing movement of said first cam with its nose engaging said second surface of said second cam prevents retraction of second cam.

6. Apparatus as claimed in claim 4, in which said mechanism comprises for each said support leg a first cam having a first nose and a first surface and being moveable relative to said body with said structure and a second cam fast with said support leg and which is pivotally connected to said body, said second cam have a second nose and a second surface, and advancing movement of said first cam with its first surface engaging said nose of said second cam causing said second cam to swing outwardly relative to said body, taking said support leg with it, then continued advancing movement of said first cam with its nose engaging said second surface of said second cam prevents retraction of second cam.

7. Apparatus as claimed in claim 3, in which said support leg in each case comprises a master leg advanceable by one of said mechanisms and a slave leg with a compression spring arranged between the master and slave legs, said slave leg leads said master leg during advance of the legs then, after said slave legs have engaged the inner surface of said pipe, said master leg continues to be advanced to compress said spring but said master leg does not advance as far as said slave leg.

8. Apparatus as claimed in claim 7, in which said mechanism comprises for each said support leg a first cam having a first nose and a first surface and being moveable relative to said body with said structure and a second cam fast with said support leg and which is pivotally connected to said body, said second cam having a second nose and a second surface, and advancing movement of said first cam with its first surface engaging said nose of said second cam causing said second cam to swing outwardly relative to said body, taking said support leg with it, then continued advancing movement of said first cam with its nose engaging said second surface of said second cam prevents retraction of second cam.

9. Apparatus as claimed in claim 3, in which said mechanism comprises for each said support leg a first cam having a first nose and a first surface and being moveable relative to said body with said structure and a second cam fast with said support leg and which is pivotally connected to said body, said second cam having a second nose and a second surface, and advancing movement of said first cam with its first surface engaging said nose of said second cam causing said second cam to swing outwardly relative to said body, taking said support leg with it, then continued advancing movement of said first cam with its nose engaging said second surface of said second cam prevents retraction of second cam.

* * * * *